United States Patent [19]
Holmström et al.

[11] Patent Number: 6,128,381
[45] Date of Patent: Oct. 3, 2000

[54] MOBILE COMMUNICATION UNIT

[75] Inventors: J. Tomas Holmström, Dalby; B. Johanna Isberg, Lund; H. F. Mikael Dahlkvist, Sandby, all of Sweden

[73] Assignee: Telefonaktiebolaget LM Ericsson, Stockholm, Sweden

[21] Appl. No.: 08/994,956

[22] Filed: Dec. 19, 1997

[30] Foreign Application Priority Data

Dec. 27, 1996 [SE] Sweden .................................. 9604805

[51] Int. Cl.$^7$ .................................................. H04M 15/00
[52] U.S. Cl. .......................... 379/356; 379/357; 379/142; 379/201; 379/211
[58] Field of Search ..................... 707/10, 104; 709/219; 455/577, 550, 418; 379/142, 201, 211, 356, 357

[56] References Cited

U.S. PATENT DOCUMENTS 5,526,411   6/1996  Krieter ..................................... 379/110
5,652,789   7/1997  Miner ....................................... 379/201

FOREIGN PATENT DOCUMENTS

| 0 534 478 A2 | 3/1993 | European Pat. Off. |
| 0 624 965 A2 | 11/1994 | European Pat. Off. |
| 0 704 788 A2 | 4/1996 | European Pat. Off. |
| 0 721 272 A2 | 7/1996 | European Pat. Off. |
| 0 776 140 A1 | 5/1997 | European Pat. Off. |
| 2 291 560 | 1/1996 | United Kingdom . |
| WO 97/09813 A1 | 3/1997 | WIPO . |

*Primary Examiner*—Hosain T. Alam
*Assistant Examiner*—Diane D. Mizrahi
*Attorney, Agent, or Firm*—Jenkens & Gilchrist, a Professional Corporation

[57] ABSTRACT

In a mobile communication unit (1), the phone book is adapted, in a first step, to enable selection of more than one item stored in the phone book and thereafter, in a second step, enable selection of an operation in the phone book to be executed on all items selected in the first step.

8 Claims, 2 Drawing Sheets

MOBILE COMMUNICATION UNIT

TECHNICAL FIELD

The invention relates to a mobile communication unit and more particularly to the phone book of a mobile communication unit.

BACKGROUND OF THE INVENTION

In phone books in mobile communication units, e.g. mobile phones, a number of predetermined operations are stored. These operations can be selected for execution on items, e.g. names and numbers for abbreviated dialling, that a user of the mobile phone has stored in the phone book. By selecting the phone book on the menu of the mobile phone, the operations stored in the phone book will be displayed on the display of the mobile phone together with the items stored in the phone book. To store items in the phone book, the keypad of the mobile phone is used in a manner known per se. The keypad is also used for selecting items displayed on the display as well as operations displayed on the display to be executed on the selected items.

Today, the use of the phone book is limited. This is i.a. due to the fact that for complex operations, such as conference calls, the user must have a detailed knowledge about the operations as such in order to be able to use them.

BRIEF DESCRIPTION OF THE INVENTION

The object of the invention is to enhance the use of the phone book in mobile phones by simplifying the steps that a user have to go through in order to utilize complex operations, e.g. establish a conference call.

This is attained in the mobile communication unit according to the invention in that it is possible to select more than one item in the phone book and thereafter select an operation to be executed on all selected items.

Hereby, it will not be necessary for a user to have a detailed knowledge about any complex operation, such as establishing a conference call, in order to utilize that operation.

BRIEF DESCRIPTION OF THE DRAWING

The invention will be described more in detail below with reference to the appended drawing, on which

PREFERRED EMBODIMENTS

Figure 1:
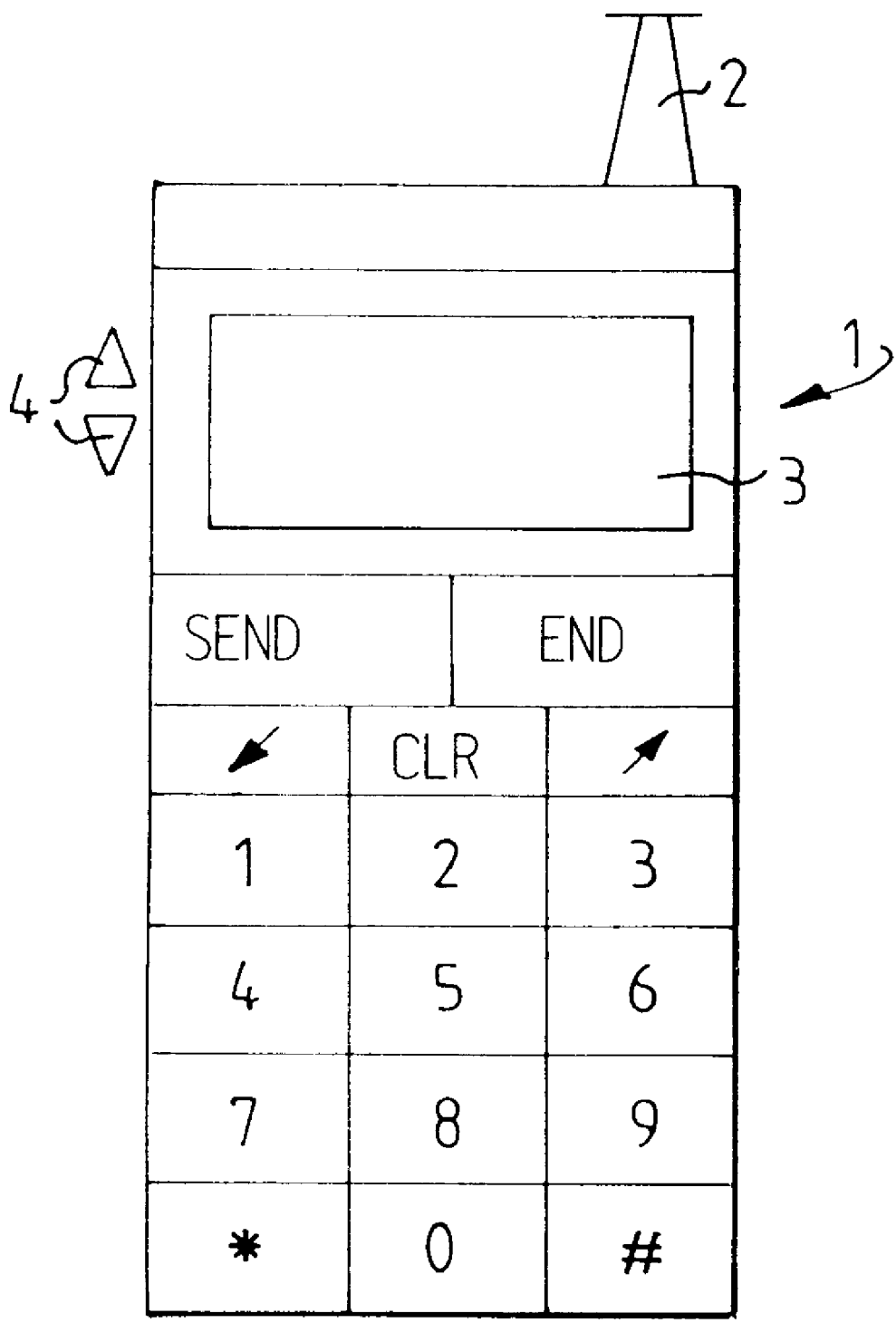
FIG. 1 shows a standard mobile phone in which the present invention has been implemented.

FIG. 1 shows an embodiment of a mobile phone generally denoted 1. In a manner known per se, the mobile phone 1 comprises an antenna 2, a display 3, and a keypad having a number of keys including i.a. normal alphanumeric keys, a SEND key, an END key, two ARROW keys, and, in the embodiment shown, on one side of the phone, two volume keys 4, which also are used as SELECT keys.

The mobile phone 1 comprises a phone book (not shown) which stores predetermined, programmed operations to be executed on items to be stored in the phone book.

In accordance with the invention, i.a. the following operations are programmed in the phone book: store, copy, erase, call, and conference call.

In order to describe the function of the phone book according to the invention, it is assumed that a number of items, i.e. names and numbers for abbreviated dialling, have been stored in a manner known per se in the phone book. Thus, it is assumed that the contents of the phone book is as indicated in the below Table 1:

TABLE 1

| Phone Book | |
|---|---|
| Adam . . . | 7 |
| Bertil . . . | 19 |
| Ceasar | ¤44 |
| . | |
| . | |
| . | |
| Zeke | ¤2 |
| Store | |
| Copy | |
| Erase | |
| Call | |
| Conference Call | |

The items indicated in the phone book according to Table 1 are names and corresponding numbers for abbreviated dialing. The abbreviated numbers preceded by a "¤" are stored in an EEPROM of the phone, while the abbreviated numbers not preceded by a "¤" are stored in a SIM card of the phone in a manner known per se.

In accordance with the invention, more than one item displayed on the display 3 can be selected by moving the cursor (not shown) to the respective item by means of the ARROW keys and, then, pressing the SELECT keys 4. It is supposed that "Adam", "Bertil", and "Zeke" have been selected. The phone book would then be displayed on the display 3 as shown in the below Table 2.

TABLE 2

| Phone Book | |
|---|---|
| Adam | 7 |
| Bertil | 19 |
| Ceasar | ¤ 44 |
| . | |
| . | |
| . | |
| Zeke | ¤2 |
| Store | |
| Copy | |
| Erase | |
| Call | |
| Conference Call | |

Now, any of the operations "Copy", "Erase", "Call" or "Conference Call" can be selected from the bottom of Table 2 for execution on the selected items in Table 2, i.e. "Adam", "Bertil", and "Zeke".

If "Copy" is to be selected, the cursor (not shown) is moved to "Copy" by means of the ARROW keys, whereupon the SEND key is pressed. Hereby, selected items in Table 2 having an abbreviated number not preceded by a "¤" are copied from the SIM card to the first free positions in the EEPROM, while items having an abbreviated number preceded by a "¤", are copied from the EEPROM to the first free positions in the SIM card.

If "Erase" is selected by moving the cursor to "Erase" by means of the ARROW keys and pressing the SEND key, the selected items in Table 2 are erased from the SIM card and the EEPROM, respectively, in the mobile phone.

If "Call" is selected by moving the cursor to "Call" by means of the ARROW keys and pressing the SEND key, the selected items in Table 2 can be called one by one. However, the user is prompted to confirm every call. By again pressing the SEND key, "Adam" is called. If the user instead presses the END key, "Adam" is not called. Instead, the user will be prompted to confirm whether or not "Bertil" is to be called. By pressing the SEND key, "Beitil" is called. By pressing the END key, "Bertil" is not called. Instead, the user will be prompted to confirm whether or not "Zeke" is to be called. If the SEND key is pressed, "Zeke" is called. If the END key is pressed, "Zeke" is not called.

If "Conference Call" is selected by moving the cursor to "Conference Call" by means of the ARROW keys and pressing the SEND key, the selected items in Table 2 can be joined into a conference call. As in the above "Call" case, the selected items will be called one by one and put on hold. The user initiating the conference call must then join the called parties to the conference call, one by one, as will be described below with reference to FIG. 2.

It is assumed that a conference call is to be established from the user to "Adam", "Bertil", and "Zeke" selected in the phone book in accordance with Table 2, as well as to a party "Bo". "Bo" is not stored in the phone book but is supposed to have phone number 043 12579.

As mentioned above, by moving the cursor to "Conference Call" by means of the ARROW keys and pressing the SEND key, the selected items in Table 2 can be joined into a conference call.

Figure 2:
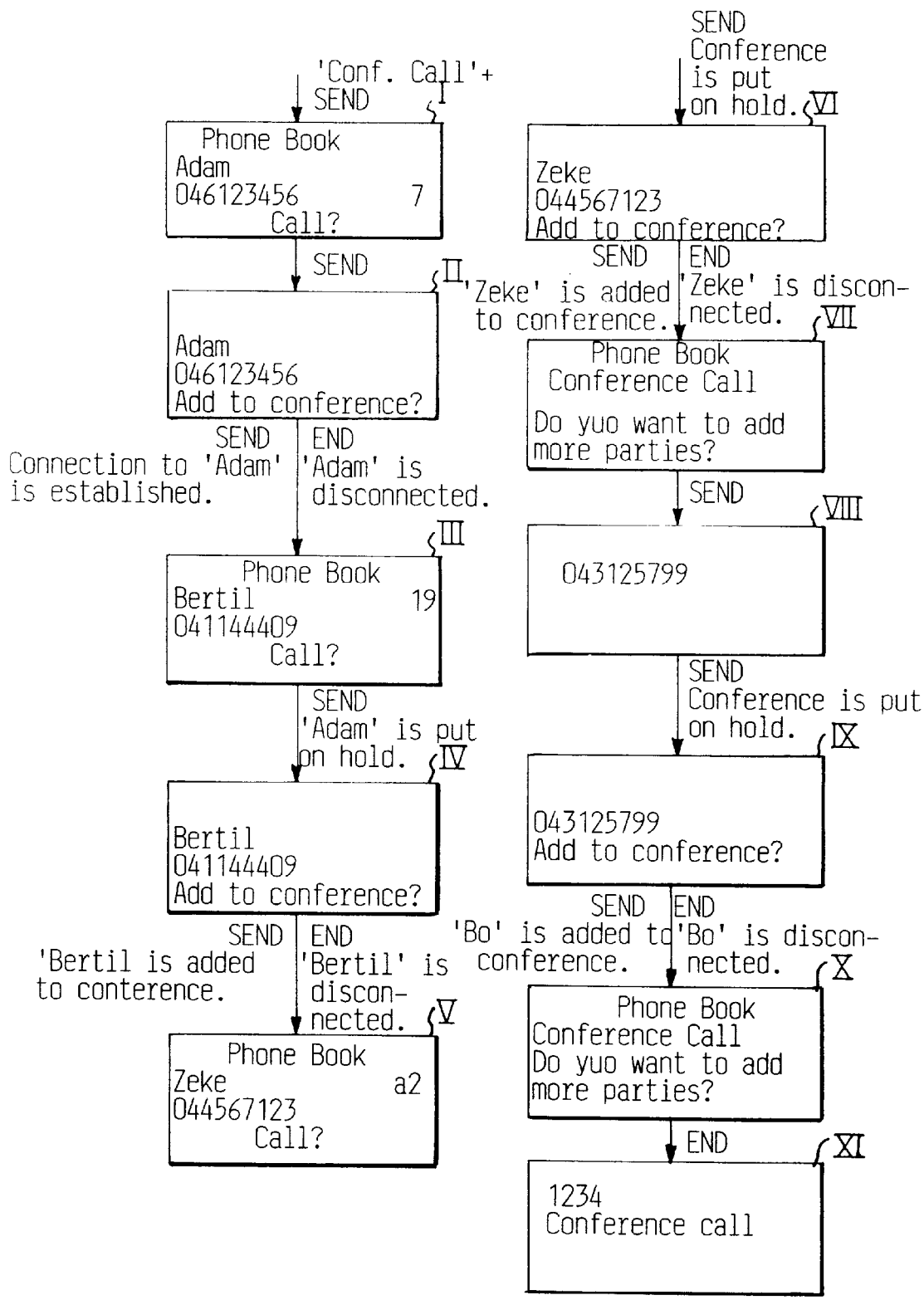
FIG. 2 is a flowchart illustrating the setting up of a conference call using the mobile phone in FIG. 1.

FIG. 2 shows what is displayed on the display 3 of the mobile phone 1 in the steps needed to establish the conference call.

In step I in the left hand column in FIG. 2, the user is prompted on the display 3 to confirm whether or not a call should be established to "Adam" having the indicated telephone number and the indicated abbreviated number.

By pressing the SEND key on the keypad of the mobile phone 1, a call will be established to "Adam". Instead, if the END key is pressed, "Adam" will not be called but the user will be prompted to confirm whether or not a call should be established to the next selected item, i.e. "Bertil".

It is assumed in FIG. 2 that a call should be established to "Adam". Thus, the user presses the SEND key and a call is established to "Adam". The display 3 will show what is illustrated in step II in FIG. 2. As is illustrated in step II, the user is prompted to confirm whether or not to add "Adam" to the conference. By pressing the END key, "Adam" is disconnected. In FIG. 2, it is assumed that the user instead presses the SEND key, whereupon a connection is established to "Adam". Then, the user is prompted to confirm whether or not a call should be established to the next selected item, i.e. "Bertil" as illustrated in step III in FIG. 2. It is assumed that the user presses the SEND key, whereupon a call is established to "Beitil" having the indicated telephone number and the indicated abbreviated number. When the SEND key is pressed, "Adam" is put on hold. In step IV, the user is prompted to confirm whether or not to add "Bertil" to the conference. If the END key is pressed, "Bertil" is disconnected. In FIG. 2, it is assumed that the SEND key is pressed, whereupon "Bertil" is added to the conference. In step V, the user is prompted to confirm whether or not a call should be established to the next selected item, i.e. "Zeke".

Moving to the right hand column of FIG. 2, it is assumed that a call is established to "Zeke" in that the user presses the SEND key. By pressing the SEND key, the conference is put on hold. In step VI, the user is prompted to confirm whether or not to add "Zeke" to the conference. If the END key is pressed, "Zeke" is disconnected. In FIG. 2, it is assumed that the SEND key is pressed, whereupon "Zeke" is added to the conference.

Now, all the selected items in Table 2 have been added to the conference by being put on hold. In accordance with the invention, the user is then prompted by the phone book to confirm whether or not more parties should be added to the conference, i.e. parties not stored in the phone book. This is illustrated in step VII in FIG. 2.

By pressing the SEND key, the user indicates to the phone book that another party should be added to the conference. In step VIII in FIG. 2, it is assumed that the user manually dials the indicated phone number, i.e. the number of the party "Bo", and presses the SEND key to establish a call to "Bo". By pressing the SEND key, the conference is put on hold.

In step IX, the user is prompted to confirm whether to add "Bo" to the conference. If the END key is pressed, "Bo" is disconnected. In FIG. 2, it is assumed that the SEND key is pressed, whereupon "Bo" is added to the conference.

In step X, step VII is repeated, namely the user is prompted to confirm whether or not more parties should be added to the conference call.

In FIG. 2, it is assumed that no further parties shold be added to the conference. Thus, by pressing the END key, the user joins the conference put on hold and the conference is made active.

The use of the phone book as a menu of items on which operations can be performed, makes the mobile phone according to the invention easy to use in that the user interface is easy to understand.

What is claimed is:

1. A mobile communication unit (1) comprising
   a phone book storing predetermined operations to be executed on items to be stored in the phone book,
   a display (3) for displaying the operations stored in the phone book, and any item stored in the phone book, and
   a keypad for keying items to be stored in the phone book, and for selecting, on one hand, items on the display and, on the other hand, operations on the display to be executed on the selected items, characterized in that the phone book is adapted to enable, in a first step, selection of more than one item displayed on the display and, in a second step, selection of an operation to be executed on all the items selected in the first step.

2. The mobile communication unit of claim 1, wherein said predetermined operations include copy, erase, call and conference call.

3. The mobile communication unit of claim 2, wherein said items are stored on at least one of an EEPROM and a SIM card.

4. The mobile communication unit of claim 3, wherein selection of said copy operation operates to copy said selected items from at least one of said EEPROM and said SIM card to at least one of said EEPROM and said SIM card.

5. A method within a mobile communication unit comprising the steps of:
   storing predetermined operations and items in a phone book, where in said operations to be executed on said items;

displaying said predetermined operations and said items to be executed;

keying said items to be stored in said phone book by means of a keypad; and selecting a plurality of said items to be executed and at least one operation for execution on each of said plurality of said items to be executed, wherein said plurality of items and said at least one operation are displayed.

6. The method of claim 5, wherein said predetermined operations include copy, erase, call and conference call.

7. The method of claim 6, wherein said items are stored on at least one of an EEPROM and a SIM card.

8. The method of claim 7, wherein selection of said copy operation operates to copy said plurality of said items to be executed from at least one of said EEPROM and said SIM card to at least one of said EEPROM and said SIM card.

* * * * *

UNITED STATES PATENT AND TRADEMARK OFFICE
CERTIFICATE OF CORRECTION

PATENT NO  : 6,128,381
DATED      : October 3, 2000
INVENTOR(S): Holmström, et al.

It is certified that error appears in the above-identified patent and that said Letters Patent are hereby corrected as shown below:

Column 4, line 30    Replace "shold"
                         With --should--

Column 4, line 66    Replace "where in"
                         With --wherein--

Signed and Sealed this

Fifteenth Day of May, 2001

Attest:

NICHOLAS P. GODICI

Attesting Officer    Acting Director of the United States Patent and Trademark Office